United States Patent [19]

Debaes et al.

[11] Patent Number: 5,116,557

[45] Date of Patent: May 26, 1992

[54] METHOD OF MAKING OBJECTS HAVING AN ELASTOMERIC OUTER WALL AND A SYNTHETIC FOAM CORE

[75] Inventors: Bernard Debaes, Damme; Hugo De Winter, Gentbrugge; Frank Nicolaus, Destelbergen, all of Belgium

[73] Assignee: Recticel, Sint-Pieters-Woluwe, Belgium

[21] Appl. No.: 487,505

[22] Filed: Mar. 2, 1990

[30] Foreign Application Priority Data

Mar. 3, 1989 [BE] Belgium .................. 8900228

[51] Int. Cl.[5] .............................. B29C 67/22
[52] U.S. Cl. ................... 264/46.6; 264/46.7; 264/24.5; 264/255; 264/309
[58] Field of Search ............ 264/45.1, 46.4, 46.6, 264/46.7, 255, 309, 245

[56] References Cited

U.S. PATENT DOCUMENTS

| | | | |
|---|---|---|---|
| 3,927,161 | 12/1975 | Powell et al. | 264/46.6 |
| 4,123,582 | 10/1978 | Musyt | 264/255 |
| 4,256,803 | 3/1981 | Savey et al. | 264/46.6 |
| 4,268,557 | 5/1981 | Bracesco | 264/46.7 |
| 4,294,880 | 10/1981 | Nishida | 264/255 |
| 4,389,454 | 6/1983 | Horacek et al. | 264/54 |
| 4,743,417 | 5/1988 | Bakkelunn | 264/45.1 |
| 4,891,081 | 1/1990 | Takahashi et al. | 264/46.6 |

FOREIGN PATENT DOCUMENTS

| | | | |
|---|---|---|---|
| 54-120670 | 9/1979 | Japan | 264/45.1 |
| 58-031719 | 2/1983 | Japan | 264/45.1 |

*Primary Examiner*—Robert A. Dawson
*Assistant Examiner*—Allan R. Kuhns
*Attorney, Agent, or Firm*—Sughrue, Mion, Zinn, Macpeak & Seas

[57] ABSTRACT

A method is disclosed of making in a mould cavity objects having an outer wall from a micro-cellular or non-cellular elastomer (7) and a core consisting at least partly of a synthetic foam (9), including the following steps: in a first step, a layer (7) of the elastomer is applied by spraying onto the surface (1) defining the mould cavity, and then, in a second step, before the elastomer is completely cured, a reaction mixture for obtaining a synthetic foam (9) is injected in the thus by the formed elastomer layer (7) defined space (8) of the mould cavity and wherein, in a third step, after the synthetic foam (9) has been cured substantially completely and forms a whole with the elastomer layer (7), the thus obtained object is demoulded.

10 Claims, 3 Drawing Sheets

METHOD OF MAKING OBJECTS HAVING AN ELASTOMERIC OUTER WALL AND A SYNTHETIC FOAM CORE

The invention relates to a method of making in a mould cavity objects having an outer wall from a micro-cellular or non-cellular elastomer and a core consisting at least partly of a synthetic foam.

Such objects can for example be made for applying the known, classic polyurethane integral foam techniques.

However, these integral foam techniques, involve, at least for certain applications, important drawbacks for instance, a relatively high foam density is required for obtaining an object with a solid skin formation which meets for example the rigid specifications aplicable in the automobile industry with respect to physical properties and optical aspect of certain parts, such as for example the steering wheel, the head and arm rests, the dashboard, etc...

As a result of this high foam density, objects with a relatively high hardness are obtained. Moreover, in these classic techniques such a skin formation requires the use of chlorofluorohydrocarbons as a blowing agent.

In document U.S. Pat. No. 4,251,476 a method of making ornamental vehicle wheels is described, consisting of spraying a thin layer of a film forming elastomer comprised in a volatile solvent on the inner wall of a mould, closing then the latter and injecting thereupon a polyurethane reaction mixture into the thus formed mould cavity.

Due to the fact that in this way a very thin film, having a thickness in the range of microns is thus formed, and in order to obtain a commercially marketable product, care has to be taken that the reaction mixture injected in the mould forms a sufficiently strong and dense skin against this film since the latter shows as such only a small mechanical resistance. Consequently, when for example a gas bubble has been formed, in the cured reaction mixture against this film, then said film is usually never durable enough for covering this gas bubble. This involves that generally also in this method polyurethane integral foam techniques are used, consequently also with the drawbacks related hereto, as it has been mentioned hereabove.

The tendency in the automobile industry is to develop parts having a minimum weight whereby the total weight of the vehicles can be reduced resulting in a smaller energy consumption.

Consequently, the automobile industry aims at developing moulded pieces with a relatively low density, lower than 700 g/dm$^3$ and a smaller hardness, for example with a shore A smaller than 50, the latter especially for a so-called "soft touch ".

This tendency is also followed by the furniture industry in the development of the sitting furniture for example.

Further, the use of chlorofluorohydrocarbons as a blowing agent in the manufacture of synthetic foam is nowadays kept away more and more since it has been accepted that they are the cause of the ozone layer decomposition in the stratosphere and that they would at the same time make increase the greenhouse effect on earth.

The invention now aims to remedy these different drawbacks and this by using a very simple method, which is not only technically and economically well-considered but allows moreover to obtain products of all types of shapes and dimensions and with a perfect finishing.

According to the invention, this method is characterized in that, in a first step, a layer of said elastomer is applied onto the surface which defines the mould cavity, by spraying a reaction mixture of several components, substantially without solvent or with a restricted solvent amount so that a layer of said elastomer, having a thickness between 0.3 and 5 mm, preferably between 1 and 2 mm, can be formed, in that, in a second step, before the elastomer is completely cured, a second reaction mixture for obtaining a synthetic form is injected in the thus by the formed elastomer layer defined space of the mould cavity and in that, in a third step, after the synthetic foam has been cured substantially completely and forms a whole with the elastomer layer, the thus obtained object is demoulded.

In a particular embodiment of the invention, use is made of a mould, consisting of at least two mutually movable mould parts which can be brought into an open and closed position, in addition to which, in said first step the elastomer layer is applied to the surface which defines the mould cavity of the mould and at least partly to the sides of the edges of said parts which are in contact with each other in the closed position of the mould, in the second step, the mould being in said closed position and before the elastomer is completely cured, the reaction components for obtaining the synthetic foam are injected in the space of the mould cavity thus defined by the formed elastomer layer and, in said third step, after the synthetic foam has been cured substantially completely and forms a whole with the elastomer layer, the mould is brought into its open position for demoulding the thus obtained object.

According to an interesting variant of the method according to the invention, in said first step, at the moment the mould is in its open position, an elastomer layer of a determined colour is applied onto the mould surface of one of the mould parts by spraying and an elastomer layer of another determined colour is applied onto the mould surface of the other mould part also by spraying, after which the mould is closed substantially immediately before starting with the hereabove defined second step.

In a perferred embodiment of the invention, use is made of a water blown reaction mixture of aromatic isocyanate compounds and hydrogen active compounds such as polyols which are substantially free of chlorofluorohydrocarbons, for forming polyurethane foam in said space of the mould cavity.

In a prefered embodiment of the invention, an elastomer layer of light stable polyurethane is formed on the mould cavity surface.

Other particularities and advantages of the invention will appear from the following description of some particular embodiments of the invention; this description is only given as an example and does not limit the scope of the invention; the reference numerals used hereafter relate to the annexed figures.

In these figures, the same reference numerals relate to the same or analogous elements.

Generally, the invention relates to a method for making in a mould cavity objects having an outer wall from a microcellular or non-cellular elastomer and a core consisting at least partly of a synthetic foam. The chemical composition of the elastomer as well as of the synthetic foam can be very different. Moreover, the elastomer and the synthetic foam do not necessarily have to belong to the same group of synthetic materials.

Figure 1:
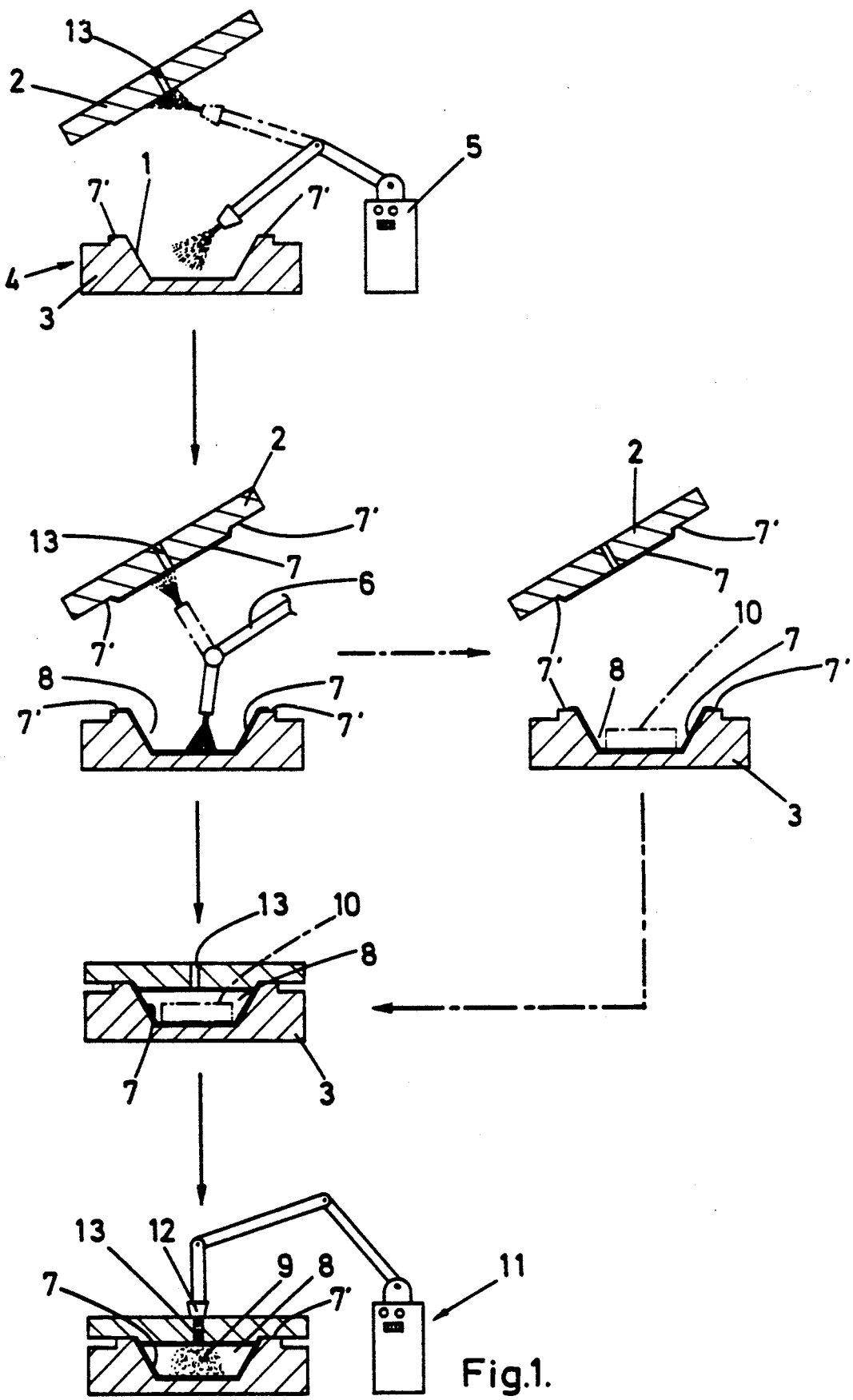
FIG. 1 is a schematic representation of the different steps of a first embodiment of the method according to the invention.

In FIG. 1, a first embodiment of the method according to the invention is schematically shown.

In a preparatory step, the mould surface 1 of the two parts 2 and 3 the used mould 4 consists of, is covered with a mould release agent by means of a spray gun 5 in order to allow the formed pieces to be easily demoulded. In some cases, the mould release agent has also an important influence on the gleam of the formed piece and consists for example of a mixture of silicones, wax and solvent. This preparation step is thus executed, with the mould in its open position.

Then, a liquid reaction mixture consisting of several components, however substantially without solvent or with a restricted solvent amount for example in the range of 5% is sprayed by means of a spray gun 6 on the mould surface 1 of both mould parts 2 and 3 in order to form an elastomer layer 7, the thickness of which is at least of 0.3 mm and at the most of 5 mm and is preferably between 1 and 2 mm. This can be done according to the technique described in Belgian patent application n° 8700792 of the same applicant. Afterwards, the mould 4 is closed by putting the two mould parts 2 and 3 against each other.

In a second step, before the elastomer is completely cured, i.e. when it is still somewhat sticky, a second reaction mixture for obtaining a synthetic foam is injected into the mould cavity space 8 defined by the formed elastomer layer 7.

Finally, in a third step, after the synthetic foam 9 is completely cured and forms a whole with the elastomer layer 7, the so obtained object is demoulded.

One of the main reasons to restrict the content of solvent, is thus to be able to form by spraying a sufficiently thick layer 7, because if, as in the known processes the reaction mixture is sprayed in presence of a relatively high content of solvent, f.i. about 20%, then generally only a very thin layer, of some microns can be obtained.

In some cases, an insert 10, such as for example a metal frame, a wooden piece, a synthetic or a textile fabric, is placed in said space 8 of the mould cavity before injecting the synthetic foam in the latter.

Injecting the reaction mixture for obtaining a synthetic foam 9 is also done by means of a spray gun 11, the nozzle 12 of which is connected to an opening 13 provided in the upper part 2 of the mould 4, which is in fact the mould cover.

Figure 2:
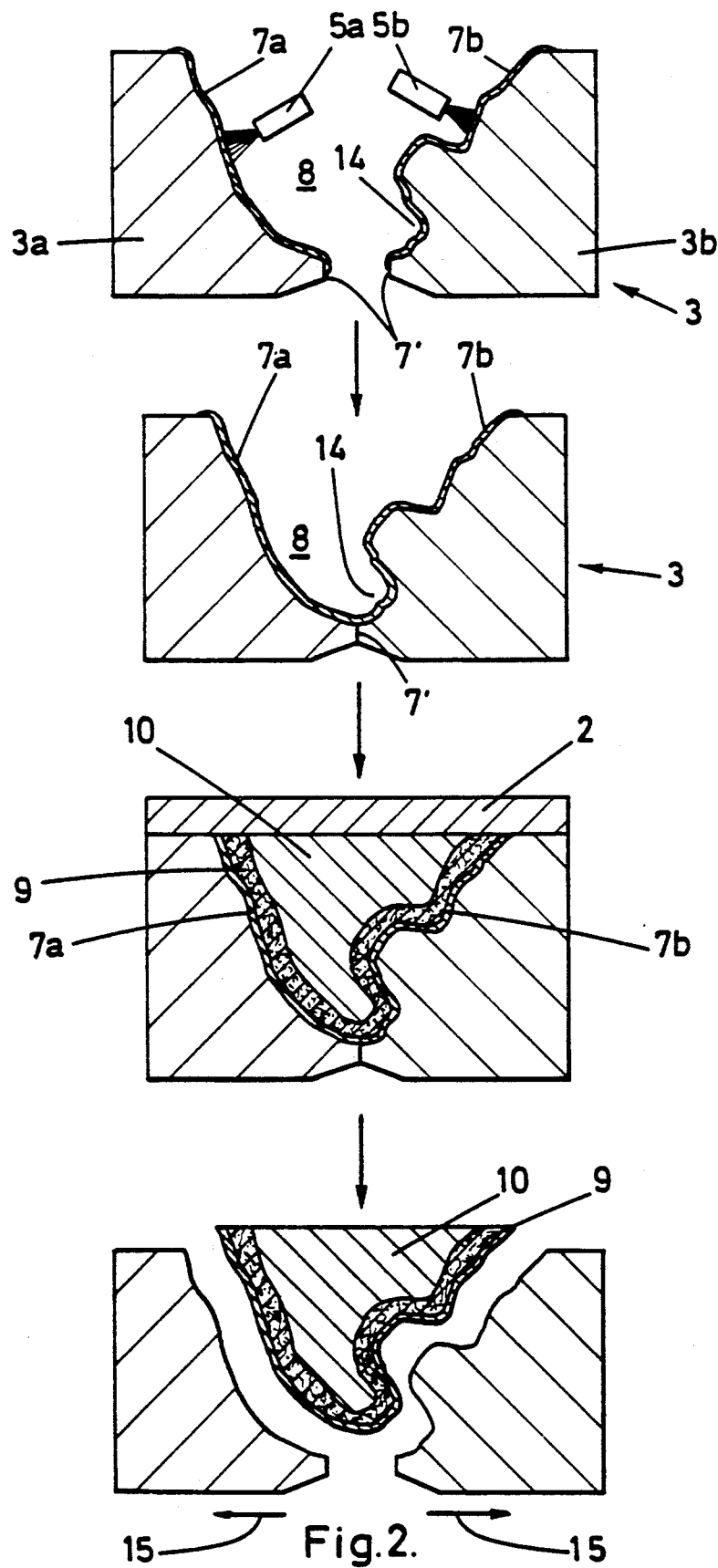
FIG. 2 is another representation of the sucessive steps in a second embodiment of the method according to the invention.

Therefore, use can for example be made of the so-called "RIM" (reaction injection moulding) technique. In FIG. 2 is shown schematically a second embodiment of the method according to the invention wherein a somewhat more complex mould 4 is used. In this embodiment, the bottom part 3 shows for example an undercut 14 which requires, in order to allow the formed piece to be removed from the mould 4, that the part 3 consists of at least two separate halves 3a and 3b which can be pulled out of each other for demoulding, as it has been indicated by arrows 15 in FIG. 2.

In this embodiment of the method according to the invention, the elastomer layer 7 can for examply be applied at the moment the parts 3a and 3b are separated from each other. This offers among others the advantage that in this way, the complete mould surface 1 is everywhere easily accessible for the spray gun 6.

Moreover, it is also possible in this embodiment to spray the mould surface 1 of these two parts 3a and 3b with an elastomer layer 7a, 7b respectively, having a different colour. Consequently also objects with two or more colours can be made and the dividing line between both colours can be very clear and accurate. This is mainly dependent on the precision of the mould construction itself.

Once the two halves 3a and 3b are disposed against each other, after the elastomer layer 7 has been sprayed, the other treatments are analogous to the ones in the previous embodiment, as it has been shown in FIG. 1. An insert 10 can possibly be placed in the space 8 of the mould cavity before putting the halves 3a and 3b against each other, for example if this insert projects into the undercut 14, as it has been shown in FIG. 2.

In an advantageous embodiment of the invention, an elastomer layer 7 consisting of a light stable polyurethane is formed.

This elastomer layer, obtained by putting several reaction components together, can be applied according to the so-called "airless" more component system without solvents.

The time period between the moment this elastometer layer is applied and the moment the synthetic foam is sprayed into the space 8 defined by this layer can be very important. Indeed care has to be taken that, on the one hand, the elastomer layer 7 is still sticky enough to assure a good adhesion between the synthetic foam and this layer and that, on the other hand, the elastomer layer has already a sufficient stability in order to avoid a destructive reaction between this layer and the synthetic foam. This time difference can be very diverse and is of course dependent on the nature of the elastomer as well as of the synthetic foam. However, when use is made of an elastomer and foam based on polyurethane, it is generally comprised between 15 and 60 seconds.

It can also be very important to use a heated mould, for polyurethane preferably upto a temperature in the range of 60°.

The used synthetic foam's nature can also be very various since for example the appearance of the formed piece is only determined by the elastomer layer 7. In an advantageous way, use is made of a water blown reaction mixture of aromatic isocyanate compounds and hydrogen active compounds, such as polyols, which are substantially free of chlorofluorohydrocarbons, for forming a polyurethane foam in the space 8 of the mould cavity.

The synthetic foam's density can be controlled completely independent on the elastomer layer 7, this in contrast to what is the case when the classic integral foam techniques are used, as it has been described hereabove.

Further, also the optical aspect of the core foam is of cource not critical and, provided that the hardness is adapted acording to the piece to be made, use can be made of the so-called aromatic polyurethane systems which are also not light stable.

Moreover, the core foam can be flexible, semi-rigid or rigid, also according to the nature of the formed piece.

Figure 3:
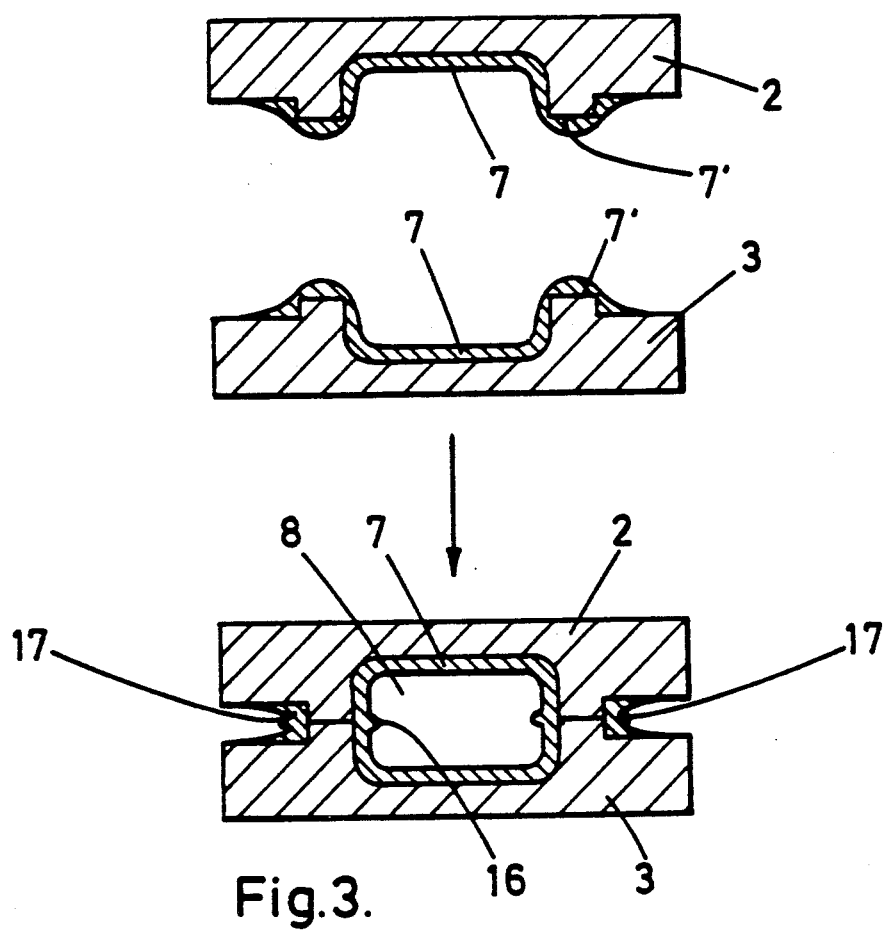
FIG. 3 is, on a somewhat larger scale, a schematic representation of a particular characteristic of a specific embodiment of the method according to the invention.

In FIG. 3 a preferred embodiment of the method according to the invention is shown more in detail.

An object of this particular embodiment is to make products having a substantially invisible dividing joint.

To this end use is made, according to the invention, of a mould 4 comprising at least two mutually movable mould parts 2 and 3, which can be brougnt into an open and a closed position and of which the sides 7' of their edges (parting surfaces) make substantially heremetically contact with each other in the closed position.

When using such a mould, the elastomer layer 7 is applied, in the hereabove described first step, not only onto the surface defining the mould cavity 8 of the mould 4 but also on the sides 7' as it appears clearly from FIG. 3. Immediately after applying the reaction mixture for forming the elastomer layer, i.e. at the moment the latter is still liquid, the mould is closed under pressure so that the elastomer layer's part, located on these sides 7', is nearly completely pressed away, at least partly towards the mould cavity so as for form an internal, anmnular thickening 16, and preferably also towards the opposite side of the sides 7', outside the mould, as it appears also clearly from FIG. 3 wherein the excess elastomer pressed outwards is indicated by reference numeral 17. In each cycle the latter is removed as a waste. In this way, a substantially invisible dividing joint is obtained on the outer side of the elastomer layer, near the place where the sides 7' of both mould parts 2 and $3^{are}$ in contact with each other. Moreover, the thickening 16 on the inner side of the dividing joint forms a useful reinforcement.

In an advantageous way, the sides 7' are preferably flat, whereas at least the side 7' of one of the mould parts 2 or 3 has a width of at least 0.5 mm and prefeably from 2 to 10 mm, dependent on the shape and the specifications of the object to be made and on the nature of the used reaction mixture for forming the elastomer layer 7. However, it has usually to be preferred that the sides 7' of both mould parts 2 and 3 have a limited width in order to avoid that the pressed away polyurethane, present at the outer side of the mould, would prevent further material to be pressed away between the sides 7'.

Figure 4:
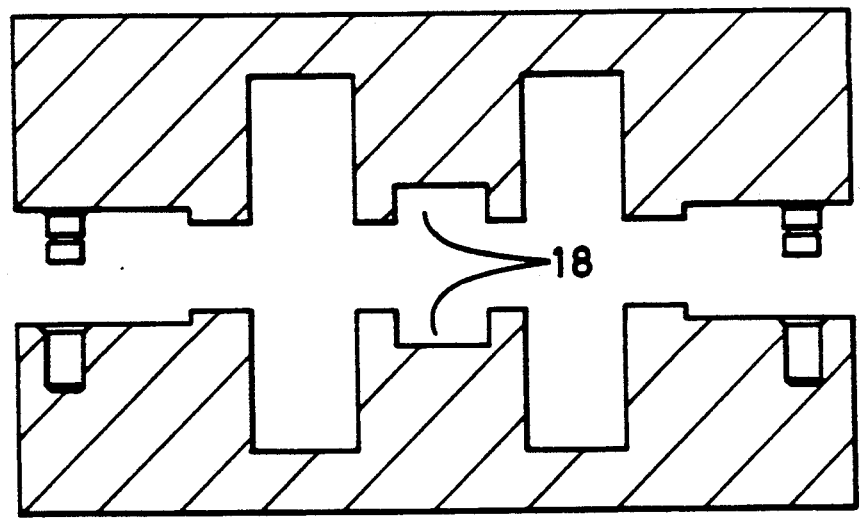
FIG. 4 is a schematic, vertical cross-section of a particular embodiment of a mould before applying a method according to the invention.

Finally, in FIG. 4 is shown a particular embodiment of a mould for making according to the method of the invention objects comprising a central hole.

In order that, when pushing the two mould parts 2 and 3 on to each other, the part of the still liquid elastomer layer, situated on the sides 7', could be pressed away in a controlled manner into the in this case annular mould cavity as well as outside the latter and this also at the inner side of the mould, at least one of the mould parts 2 or 3, but preferably both of them, shows a central recess 18, which can receive the excess elastomer pressed outwards at the inner side of the mould parts' inner edge. The depth of this recess is of course somewhat dependent on the mould's nature and the elastomer amount applied already onto this mould part. A depth of about 10 mm will usually be appropriate.

In order to illustrate the method according to the invention, two particular examples of the method according to the invention and especially of the chemical formulations of both the elastomer layer and the synthetic foam which is appropriate for being injected in the space 8 of the mould cavity, are given hereafter.

EXAMPLE 1

An elastomer layer has been formed on the inner surface of a mould consisting of two parts, which mould can be closed by a cover as it has been schematically shown in FIG. 2, after this inner surface as well as the inner side of the cover has been covered with a release agent on the basis of silicones, wax and solvent. This elastomer layer has been obtained by spraying a polyolcyanate reaction mixture at a flow rate of 25 g/sec, the polyol component pressure being 150 bars and the one of isocyanate component being 100 bars.

1. Characteristics of the polyol (first component)

| Formulation in parts by weight | |
|---|---|
| Polyether-triol which is obtained by adding propylene oxide and ethylene oxide to glycerin as an initiator (OH index: 3; primary OH radical content: 80%) | 100 |
| Ethylene glycol: | 5 |
| N'N-dimethylburtanediamine: | 5 |
| Lead octoate (33% lead metal) | 0.7 |
| Colour paste: | 5 |
| | 115.7 |
| Properties | |
| Viscosity at 25° C. in MPa.s: | 1170 |
| Viscosity at 45° C. in MPa.s: | 300 |
| Viscosity at 65° C. in MPa.s: | 150 |
| Density (21° C.) | 1.02 |

2. Characteristics of the isocyanate (second component)

| Formulation in parts by weight | |
|---|---|
| Quasi-prepolymer (100 parts isophoronediisocyanate + 13.28 parts dipropylene glycol — final content of NCO groups: 26%): | 67.1 |
| dimethylstanodineodecanoate | 1 |
| | 68.1 |
| Properties | |
| Viscosity at 25° in MPa · s: | 1450 |
| Viscosity at 45° in MPa · s: | 350 |
| Viscosity at 65° in MPa · s: | 50 |
| Density (21°) | 1.07 |
| Ratio: $\frac{\text{polyol component}}{\text{isocyanate component}} = \frac{115.7}{68.1} = 1.7$ | |

As soon as this elastomer has been applied onto the inner surface and the dividing joint of the mould, the latter has been closed and a reaction mixture for forming a semi-rigid polyurethane foam has been sprayed, after about 20 to 25 seconds, via an opening provided in the mould cover, into the closed space of the mould. This reaction mixture corresponded to the next formulation:

a) Polyol component
100 parts polyether-polyol cross-linker with a hydroxyl index of 1010 known under the trademark "U2311" of BP chemicals.
4 parts water
0.5 parts 2-methylimidazole
0.2 parts trimethylaminoethylethanolamine, known under the trademark "Dabco T" of "Air Products"

1.0 parts polydimethylsiloxane -polyether copolymer, known under the trademark "RS091" of BP Chemicals;

2.0 parts of a polyether polyol cell-opener, known under the trademark "PU3170" of Bayer.

b) Isocyanate component 67.74 parts of a methyldiisocyanate prepolymer (MDI) having a functionality of 2.49 and a NCO-number of 30.6, known under the trademark "ISO VM 50" of ICI.

After about 6 minutes, at the moment this reaction mixture was completely cured, the thus formed object has been demoulded.

EXAMPLE 2

In this example, the same mould as in example 1 has been used. The formed elastomer layer has been obtained by spraying a polyol-isocyanate reaction mixture at a flow rate of 10 g/sec, the pressure of the polyol component was also 150 bars and the one of the isocyanante component was 100 bars.

1. Characteristics of the polyol (first component)

| Formulation (in parts by weight) | |
|---|---|
| Polyethertriol of the same type as in example 1: | 90 |
| Dabco 33 Lv (triethylene diamine: 33% in a solution of DPG): | 2.25 |
| Butanediol: | 7.9 |
| Colour paste: | 5 |
| | 105.15 |
| Properties | |
| Viscosity at 25° in MPa.s | 1060 |
| Viscosity at 45° in MPa.s | 320 |
| Denisty (21° C.): | 1.02 |

2. Characteristics of the isocyanate (second component)

| Formulation | |
|---|---|
| isocyanate RMA 200 (Upjohn): | 43.5 |
| Properties | |
| Viscosity at 25° C. in MPa · s: | 620 |
| Viscosity at 45° C. in MPa · s | 126 |
| Density (21° C.) | 1.21 |

$$\text{Ratio: } \frac{\text{polyol component}}{\text{isocyanate component}} = \frac{105.25}{43.5} = 2.42$$

As soon as this elastomer has been applied onto the inner surface of the mould, the latter has been closed and a reaction mixture for forming a polyurethane has been sprayed, after about 15 to 20 seconds, via an opening provided in the mould cover, into the closed space of the mould.

This reaction mixture corresponded to the next formulation:

a) Polyol component 100 parts polyether-polyol cross-linker with hydroxyl index: 36, known under the trademark "PBA 6500" of ICI;

2.75 parts water:

0.15 parts of an amine catalyst with retarding action, known under the trademark "X 8154" of "Air Products";

0.10 parts of a mixture of bis (2-dimethylaminoethyl) ether (70%) and dipropylene glycol (30%), known under the trademark "A 1" of "Union Carbide";

0.60 parts dimethylhexadecylamine, known under the trademark "DM16D" of "Air Products"

0.60 parts polydimethylsiloxane-polyether copolymer, known under the trademark "B4113" of "Goldschmidt";

2 parts polyether polyol cell-opener, known under the trademark "PU3170" of Bayer 0.1 parts dimethylaminopropylamine, known under the trademark "DMAPA" of "Air Products".

b) Isocyanate component 47 parts of methyldiisocyanate prepolymer (MDI) having a functionality of 2.28 and a NCO number of 25, known under the trademark "VM 28" of ICI.

After about seven minutes, at the moment this reaction mixture was completely cured, the thus formed piece has been demoulded.

The invention is of course in no way limited to the hereabove described embodiments and within the scope of the invention, several modification can be taken into consideration among others with respect to the nature of the used polymer, the synthetic foam and also of the technique of spraying the polymer layer and injecting the synthetic foam. In this way, it can be possible in some cases to use a not completely closed mould wherein the synthetic foam can foam substantially freely.

Further, the mould can be very different, depending on the object to be made. The mould can for example consist of different, mutually hingingly connected parts which can be brought then by means of a hydraulic system into an open and a closed position.

What is claimed is:

1. A method of making in a mould cavity objects having an outer wall from a micro-cellular or non-cellular elastomer and a core comprising a synthetic foam, wherein use is made of a mould comprising at least two mutually movable mould parts, which can be brought into an open and closed position with respect to each other, said parts having edges with contacting sides adjacent said mould cavity which are in substantially hermetically closed contact with each other in said closed position, the improvement comprising:

applying, in a first step, a first layer of said elastomer onto a first mould part of said at least two mutually movable mould parts and a second layer of said elastomer onto a second mould part of said mutually movable mould parts, said elastomer layers also being applied onto said contacting sides of said edges of said first and second mould parts while said at least two mutually movable mould parts are in said open position;

bringing, in a second step, the mould parts into said closed position while said elastomer is still substantially liquid so as to press at least a part of said elastomer layers located on said contacting sides of said edges away in the direction of said mould cavity, and to bring said contacting sides of said edges of said first and second mould parts into a hermetically closed state against each other, thereby connecting said elastomer layers such that a substantially invisible dividing joint is obtained on a side of said elastomer layers facing said mould parts and a thickening serving as a reinforcement is formed on a side of said elastomer layers facing said mould cavity, and injecting into a space defined by said elastomer layers a second reaction mixture which forms a synthetic foam; and demoulding, in a third step, after said synthetic foam has been cured substantially completely and forms a whole with said elastomer layers, a moulded object.

2. A method according to claim 1, wherein use is made of a mould with mould parts, said sides of which have such a width that when closing said mould, said still substantially liquid elastomer layer, located between said sides is pressed away from as well as toward said mould cavity as on the opposite side of said sides.

3. A method according to claim 1, wherein use is made of a mould with mould parts, said side of which are substantially completely flat and have a width of at least 0.5 mm and preferably of 2 to 10 mm.

4. A method according to claim 1, wherein, in said first step, at the moment said mould is in its open position, an elastomer layer of a pre-determined colour is applied onto said mould surface of one of said mould parts by spraying and an elastomer layer of another pre-determined colour is applied onto said mould surface of another mould part also by spraying, after which said mould is closed substantially immediately before starting with said hereabove defined second step.

5. A method according to claim 1, wherein an insert is placed in said mould cavity before starting with said second step.

6. A method according to claim 1, wherein use is made of a water blown reaction mixture of aromatic isocyanate compounds and hydrogen active compounds such as polyols, which are substantially free of chlorofluorohydrocarbons, for forming polyurethane foam in said space of said mould cavity.

7. A method according to claim 1, wherein an elastomer layer of at least two reaction components is formed by spraying said reaction components without solvents.

8. A method according to claim 1, wherein, on said mould cavity surface, an elastomer layer is formed of light stable polyurethane.

9. A method according to claim 1, wherein after a reaction time of 15 to 60 seconds of said elastomer layer on said mould surface, said synthetic foam is injected in said space of said mould cavity.

10. A method according to claim 1, wherein use is made of a mould which is preferably heated up to a temperature of about 60° C.

* * * * *